(12) United States Patent
Astrike et al.

(10) Patent No.: US 11,130,386 B2
(45) Date of Patent: Sep. 28, 2021

(54) RIGID ENDCAP FOR A DUCT SYSTEM IN A HEADLINER

(71) Applicants: Toyota Motor Engineering & Manufacturing North America, Inc., Plano, TX (US); Toyota Jidosha Kabushiki Kaisha, Toyota (JP)

(72) Inventors: Logan R. Astrike, Dexter, MI (US); Toshinao Wada, Miyoshi (JP); Skylar C. Watson, Williamston, MI (US); Chad Eric Anderson, Ypsilanti, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 59 days.

(21) Appl. No.: 16/585,738

(22) Filed: Sep. 27, 2019

(65) Prior Publication Data
US 2021/0094384 A1    Apr. 1, 2021

(51) Int. Cl.
*B60R 21/213*    (2011.01)
*B60H 1/00*    (2006.01)
*B60R 21/232*    (2011.01)

(52) U.S. Cl.
CPC ........ *B60H 1/00564* (2013.01); *B60R 21/213* (2013.01); *B60R 21/232* (2013.01)

(58) Field of Classification Search
CPC .. B60R 21/213; B60R 21/232; B60H 1/00564
USPC ..................................................... 280/730.2
See application file for complete search history.

(56) References Cited

U.S. PATENT DOCUMENTS

| | | | |
|---|---|---|---|
| 7,762,574 B1* | 7/2010 | Spamer | B60R 21/213 280/728.2 |
| 7,871,103 B2* | 1/2011 | Torii | B60R 7/10 280/728.2 |
| 9,278,656 B2 | 3/2016 | Boroel et al. | |
| 2010/0320734 A1* | 12/2010 | Spamer | B60H 1/3421 280/730.2 |
| 2015/0321623 A1* | 11/2015 | Boroel | B60R 21/213 280/730.2 |
| 2016/0037664 A1* | 2/2016 | Hendricks | H05K 5/0204 361/814 |

FOREIGN PATENT DOCUMENTS

JP    5875025 B2    3/2016
WO    20140192317 A1    12/2014

* cited by examiner

*Primary Examiner* — James A Shriver, II
*Assistant Examiner* — Hilary L Johns
(74) *Attorney, Agent, or Firm* — Christopher G. Darrow; Darrow Mustafa PC

(57) ABSTRACT

A duct system, and more particularly, a rigid endcap of the duct system can be configured to prevent a register from being damaged and from being displaced upon a curtain side airbag deployment. The duct system can include a headliner defining an opening, and a soft duct operatively connected to the headliner. The duct system can include a rigid endcap operatively connected to the headliner and to the soft duct. An airflow channel can be defined by the headliner, the soft duct, and the rigid endcap. Additionally, the rigid endcap can define a terminal end of the airflow channel, and the opening can be located along the airflow channel directly below the rigid endcap.

13 Claims, 4 Drawing Sheets

RIGID ENDCAP FOR A DUCT SYSTEM IN A HEADLINER

FIELD

The subject matter described herein relates generally to vehicles, and, more particularly, to fluid flow ducts for vehicles.

BACKGROUND

A curtain airbag system provides protection for vehicle occupants in a collision. The airbag system includes a curtain side airbag that can be positioned at various locations within a passenger compartment of a vehicle. For example, the curtain side airbag can be located in a headliner of the vehicle. When deployed, the curtain side airbag displaces a portion of the headliner and expands into the passenger compartment of the vehicle to protect the passenger from injury during an accident.

SUMMARY

In one respect, the present disclosure is directed to a duct system for a vehicle. The duct system can include a headliner defining an opening, and a soft duct operatively connected to the headliner. The duct system can include a rigid endcap operatively connected to the headliner and to the soft duct. An airflow channel can be defined by the headliner, the soft duct, and the endcap. Additionally, the rigid endcap can define a terminal end of the airflow channel, and the opening can be located along the airflow channel directly below the rigid endcap.

DETAILED DESCRIPTION

Figure 1:
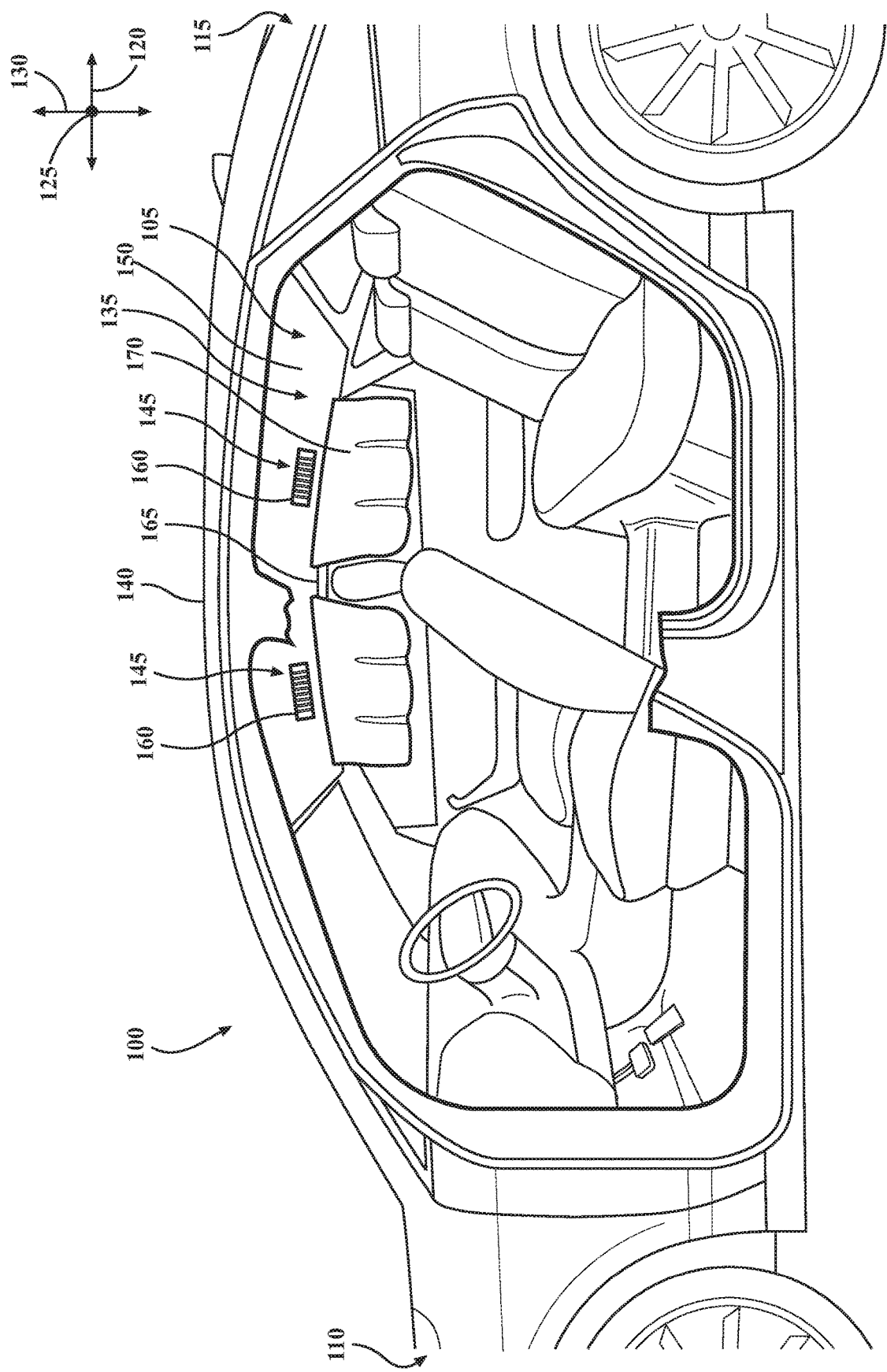
FIG. 1 is an example of a portion of a vehicle including an interior with registers and a curtain side airbag in a deployed position.

In vehicles equipped with curtain side airbags, components located in or near the deployment path of the curtain side airbag may be subjected to forces associated with airbag deployment. Headliners can include components that are susceptible to being damaged if impacted during deployment of a curtain side airbag. For example, air ducts and associated registers attached to the headliner can be damaged. In some instances, portions of these components can break off and become projectiles within the interior of the vehicle. Moreover, in some instances, the air ducts and/or the registers may deform in such a way to adversely affect airflow. Accordingly, arrangements described herein are directed to the use of a rigid endcap at a terminal end of a duct system. The rigid endcap can be located directly above the register. The rigid endcap can withstand such forces and can physically shield more fragile components, such as the register and/or other components.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 shows an example of a portion of a vehicle 100 including an interior 105. The interior 105 of the vehicle 100 can be a compartment or seating area for passengers. As used herein, "vehicle" means any form of motorized transport. In one or more implementations, the vehicle 100 can be an automobile. While arrangements will be described herein with respect to automobiles, it will be understood that embodiments are not limited to automobiles The vehicle 100 can include a forward end 110 and a rearward end 115. The vehicle 100 can have an associated longitudinal direction 120. The longitudinal direction 120 can generally correspond to the forward-rearward direction of the vehicle 100. The vehicle 100 can have an associated lateral direction 125 (extending into and out of the page in FIG. 1), which can be substantially perpendicular to the longitudinal direction 120. The lateral direction 125 can generally correspond to the left-right direction of the vehicle 100. The vehicle 100 can have an associated elevational direction 130. The elevational direction 130 can be substantially perpendicular to the longitudinal direction 120 as well as the lateral direction 125. The elevational direction 130 can generally correspond to the top-bottom direction of the vehicle 100.

Figure 2:
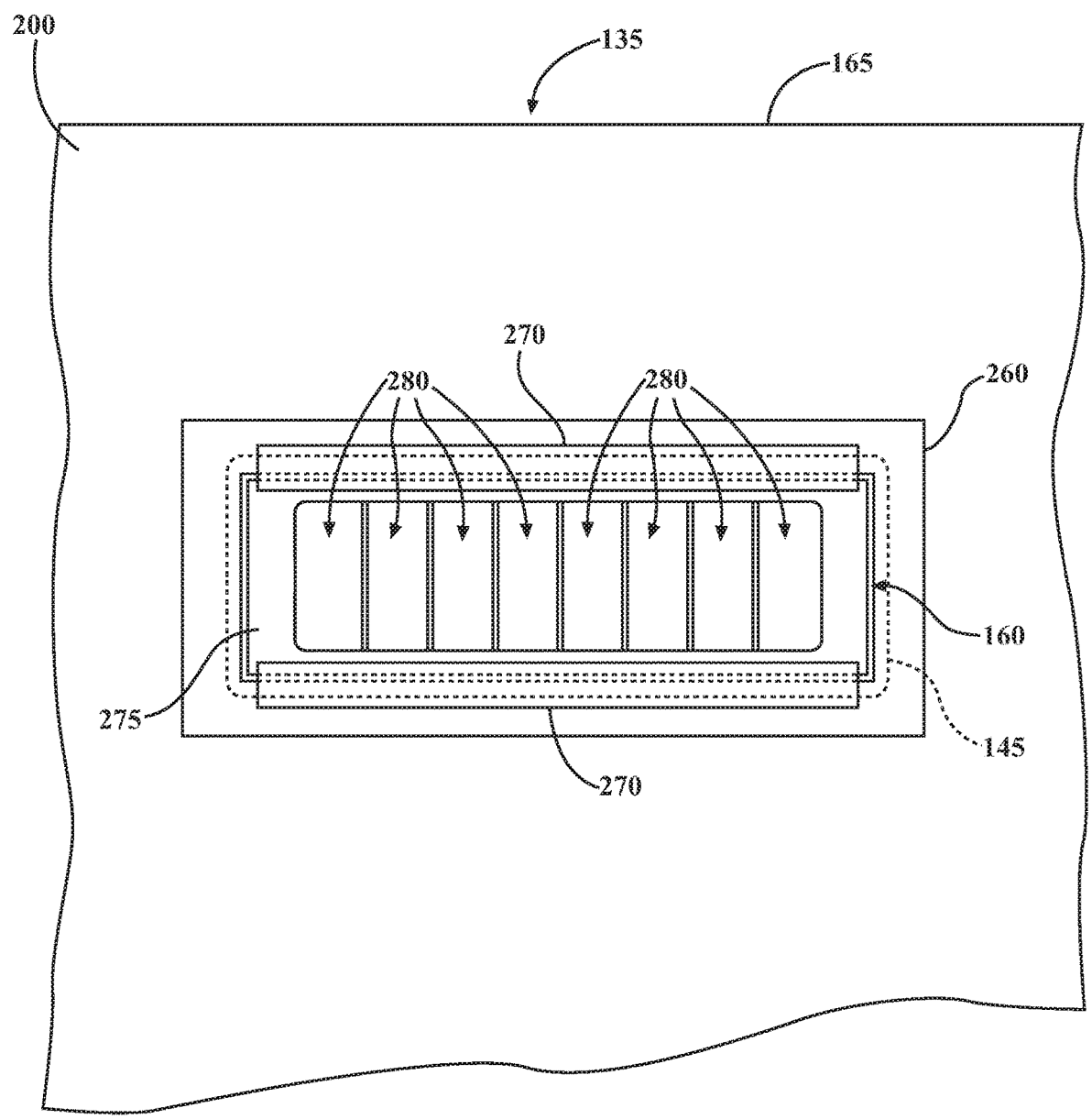
FIG. 2 is an example of a portion of a duct system showing the register.

The vehicle 100 can include a headliner 135. The headliner 135 can span the entirety or any portion of the interior 105 above occupants. The headliner 135 can define at least a portion of a ceiling of the interior 105 of the vehicle 100. The headliner 135 can be operatively connected to a roof 140 and/or roof crossmembers of the vehicle 100 in any suitable manner, such as by one or more fasteners, one or more adhesives, and/or one or more forms of mechanical engagement. As used herein, the term "operatively connected," as used throughout this description, can include direct or indirect connections, including connections without direct physical contact. In one or more arrangements, openings 145 can be defined in the headliner 135. The openings 145 can at least partially define outlets of an air duct. The headliner 135 can define additional openings for other purposes. The headliner 135 can include an inner surface 150 and an outer surface 200 (FIG. 2). The inner surface 150 can be the surface that faces toward occupants in the interior 105 of the vehicle 100. The outer surface 200 can be opposite to the inner surface 150 and can face the roof 140.

The headliner 135 can be made of a single piece of material. Alternatively, the headliner 135 can be made of a plurality of pieces of material. For instance, the headliner can be made of a plurality of layer or portions. In some instances, the layers or portions can have differing properties and/or can be made of different materials. For example, the headliner 135 can include a semi-rigid backing material of plastic, polymers, and/or fibrous material that can define the outer surface 200. The headliner 135 can include a layer of decorative material that can define the inner surface 150. The decorative material can be formed of fabric or fabric-like material, e.g., knitted fabric. In some instances, the outer surface 200 can be configured to include mounting structures to allow for the headliner 135 to be operatively connected to the roof 140, roof crossmembers, and/or other vehicle components.

Figure 3:
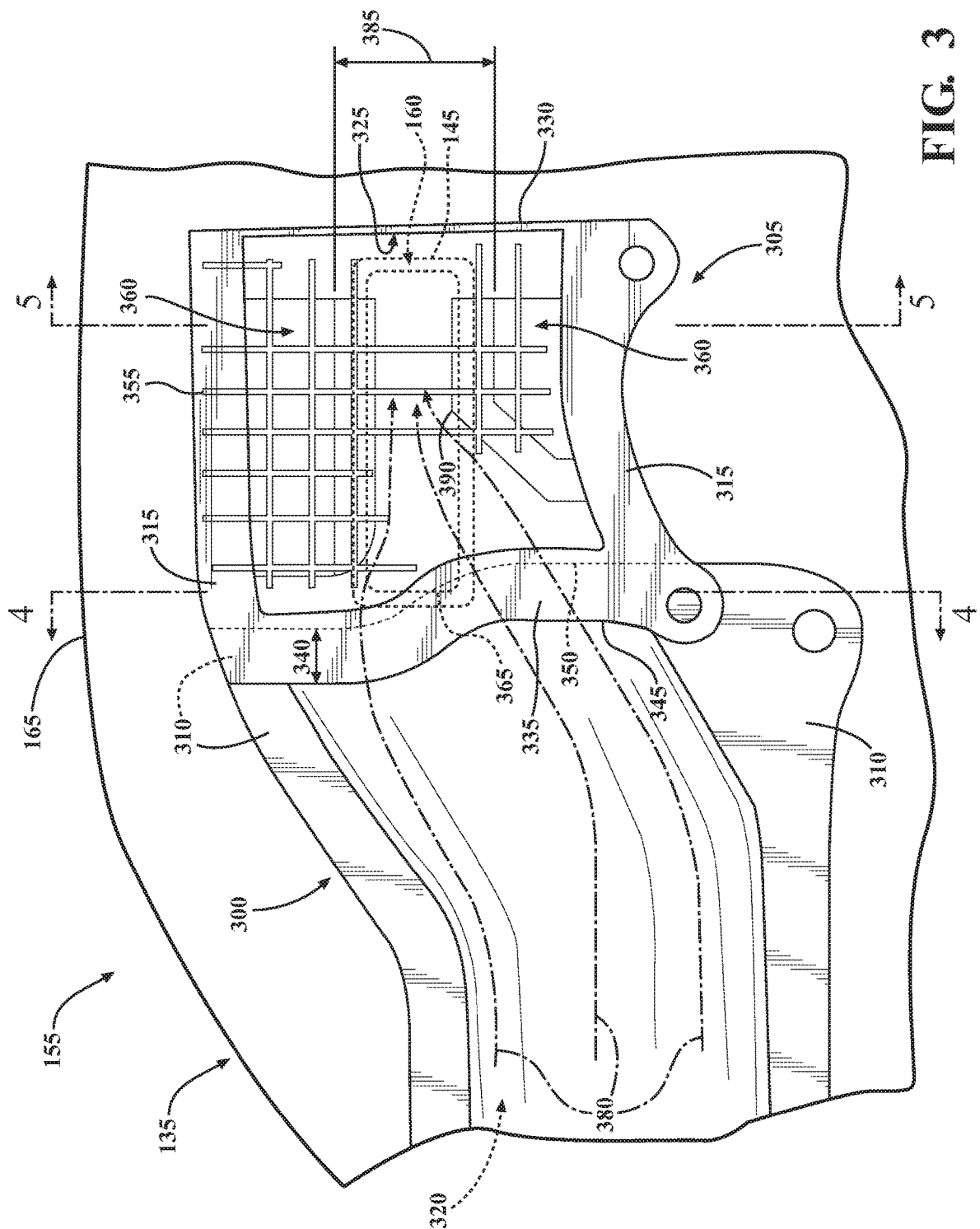
FIG. 3 is the duct system showing structural fins and pockets of the rigid endcap.

The vehicle 100 can include a duct system 155 (FIG. 3). The duct system 155 can be located at least partially between the headliner 135 and the roof 140 of the vehicle 100. A heating, ventilation and air conditioning (HVAC) system of the vehicle 100 can be operatively connected to the duct system 155 to cause air to flow within the duct toward the one or more openings 145 in the headliner 135. The duct system 155 can have any configuration and can include various components. As set forth below, various examples of the duct system 155 will be described.

The duct system 155, in one or more arrangements, can include one or more registers 160. For example, the vehicle 100 can include one or more registers 160 near a lateral edge 165 of the headliner 135, as is shown in FIG. 1. The registers 160 can be operatively positioned within the openings 145 in the headliner 135. The registers 160 can be configured to divert the flow of air to various locations in the interior 105 of the vehicle 100, as described further below. The registers 160 can be any type of register, now known or later developed. It will be appreciated that corresponding openings and registers can be provided on the opposite lateral edge of the headliner 135. The registers 160 can be operatively connected to any suitable structure, such as the headliner 135 and/or other structures.

The vehicle 100 can include one or more airbags. For example, in one or more arrangements, the airbags can be curtain side airbags (CSA) 170, as shown in FIG. 1. Furthermore, the CSA 170 can be positioned proximate to the lateral edge 165 of the headliner 135. It will be appreciated that there can be corresponding CSA 170 positioned proximate to the opposite lateral edge of the headliner 135. The CSA 170 can be operatively connected to the outer surface 200 of the headliner 135 and/or portions of the vehicle 100 near the lateral edge 165 of the headliner 135. The CSA 170 can be configured to inflate from a non-deployed position (FIG. 5) to a deployed position (FIG. 1). In the deployed position, the CSA 170 can extend into the interior 105 of the vehicle 100. The CSA 170 can extend downward in the elevational direction 130 near either side of vehicle 100, e.g., a driver side or a passenger side. For example, one CSA 170 is shown in the deployed position on the passenger side in FIG. 1. The CSA 170 in the deployed position can cushion the occupants from impacts to the sides of the vehicle 100. Upon the occurrence or detection of an activation event, vehicle sensors can signal airbag inflators to inflate the CSA 170 rapidly. For example, the CSA 170 can be deployed during an activation event, such as a vehicle crash. The CSA 170 can be any type of CSA, now known or later developed.

During its rapid inflation, the CSA 170 can impact and/or exert forces on surrounding vehicle components. In some arrangements, The CSA 170 can be configured to push through and tear headliner 135 to extend into the interior 105 of the vehicle 100.

FIG. 2 illustrates the register 160 as viewed through the roof 140 of the vehicle in the elevational direction 130. Other portions of the duct system 155 are not shown in this view for clarity. The duct system 155 can include a bracket 260. The bracket 260 can be operatively connected to the outer surface 200 of the headliner 135 around a periphery of the opening 145 in any suitable manner, such as one or more fasteners, one or more adhesives, and/or one or more forms of mechanical engagement. In some arrangements, a portion of the bracket 260 can overhang the opening 145 and/or can extend into the opening 145. The bracket 260 can provide support to the headliner 135 near the periphery of the opening 145. The bracket 260 can redistribute forces when contact occurs between the duct system 155 and the CSA 170 during a CSA deployment, as discussed further below. The bracket 260 can be formed of any suitable rigid material, such as metal (e.g., steel, aluminum), plastic, etc.

Figure 4:
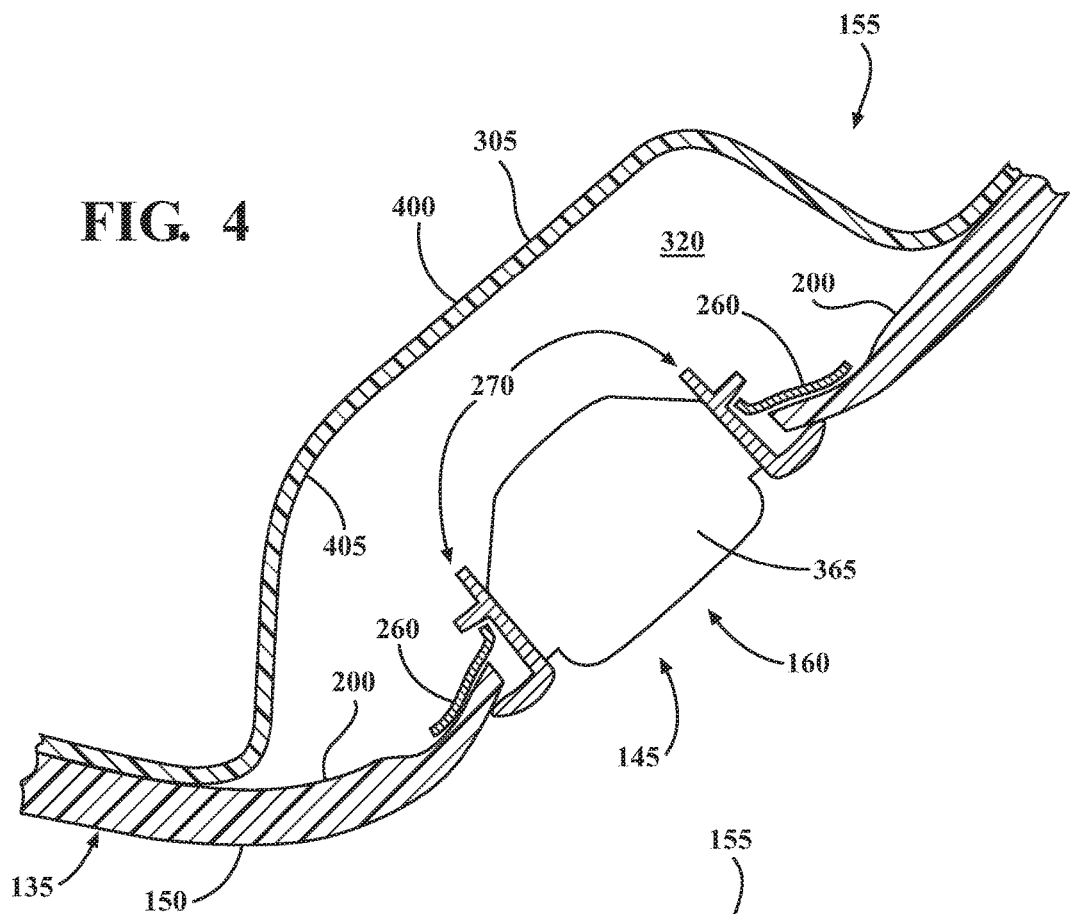
FIG. 4 is a cross-sectional view of the duct system, viewed along line 4-4 in FIG. 3, showing the air-diverting register operatively connected to the headliner

The register 160 can be operatively connected to the bracket 260 and/or the headliner 135 using one or more fasteners 270. For example, FIG. 2 shows two fasteners 270. The fasteners 270 can retain the register 160 in the opening 145. The fasteners 270 can contact both the headliner 135 and the bracket 260. As an illustration, FIG. 4 is a cross-sectional view of the duct system 155 along line 4-4 in FIG. 3 showing the register 160 engaging the fasteners 270. In one or more arrangements, the fasteners 270 can be molded into the register 160. In other arrangements, the fasteners 270 can be operatively connected to the register 160 along any side of the register 160 by one or more forms of mechanical engagement, welds, screws, rivets, etc. In some arrangements, the register 160 can be configured to retain the fasteners 270. The fasteners 270 can contact the bracket 260 and/or the headliner 135 in multiple locations along the periphery of the opening 145.

The register 160 can include a frame 275 and louvers 280, as shown in FIG. 2. In some arrangements, the louvers 280 can be manually adjusted by occupants in the interior 105 of the vehicle 100 to direct the flow of air throughout the interior 105. The louvers 280 and frame 275 can be made from a variety of materials such as polymers, metals, etc. The louvers 280 are shown in a closed position in FIG. 2 and can be adjusted into various opening positions, including when the louvers 280 can be substantially perpendicular to the opening 145. Air can exit an airflow channel 320 into the interior 105 of the vehicle through the opening 145/register 160.

FIG. 3 illustrates the duct system 155 as viewed through the roof 140 of the vehicle 100 in the elevational direction 130. In one or more arrangements, the duct system 155 can include a soft duct 300 and a rigid endcap 305. The soft duct 300 can be operatively connected to the headliner 135. For instance, a flange 310 of the soft duct 300 can be operatively connected to the outer surface 200 of the headliner 135, such as by adhesive (e.g., hot melt thermoplastic adhesive), tape, mechanical fasteners, etc. Furthermore, the rigid endcap 305 can be operatively connected to the headliner 135. As an example, a flange 315 of the rigid endcap 305 can be operatively connected to the outer surface 200 of the headliner 135. The flange 315 of the rigid endcap 305 can also be operatively connected to the flange 310 of the soft duct 300, e.g., adhesive (e.g., hot melt thermoplastic adhesive), tape, mechanical fasteners, etc. The flange 310 of the soft duct 300 and the flange 315 of the rigid endcap 305 can be substantially parallel to each other and to the outer surface 200 of the headliner 135.

The soft duct 300 can be made of any suitable material. For example, the soft duct 300 can be made of thin sheet metal, resins, or plastics. In some arrangements, the soft duct 300 can include glass or carbon fibers for added support. The soft duct 300 can be a non-load bearing and/or a non-impact resistant structure. As a result, the soft duct 300 can deform when subjected to substantial force, such as the forces from a CSA deployment. The soft duct 300 can be lightweight. Other suitable embodiments for the soft duct 300 are described in U.S. Pat. Nos. 9,278,656 and 7,871,103, both of which are incorporated herein by reference.

The rigid endcap 305 can be formed of any suitable material. The rigid endcap 305 can be an impact resistant structure, and the rigid endcap 305 can withstand the forces exerted on it during the CSA deployment. For example, the rigid endcap 305 can be formed of a molded plastic material of sufficient thickness, such as a thermoplastic polymer, e.g., polycarbonate (PC), acrylonitrile ethylene styrene (AES), etc. The rigid endcap 305 can be configured to minimize bending, flexing and/or deforming from an initial shape. After being subjected to forces associated with the CSA deployment, the rigid endcap 305 can substantially retain its initial shape. The rigid endcap 305 can have a substantially uniform thickness, or the rigid endcap 305 can have portions with varying thickness. The rigid endcap 305 can be a load bearing structure.

With continued reference to FIG. 3, the airflow channel 320 can be defined by the outer surface 200 of the headliner 135, the soft duct 300, and the rigid endcap 305. In one or more arrangements, the rigid endcap 305 can define a terminal end 325 of the airflow channel 320. That is, the duct system 155 can terminate at a terminating end 330 of the rigid endcap 305. Thus, the airflow within the airflow channel 320 generally does not flow beyond the terminal end 325. Instead, the airflow can exit the airflow channel 320 through the opening 145.

In some arrangements, the opening 145 can be located along the airflow channel 320 near the terminal end 325. The opening 145 can be located directly below the rigid endcap 305. In this context, "directly below" means that the rigid endcap 305 is spaced from and substantially aligned with at least a portion of the opening 145 such that an imaginary projection of the opening 145 in a direction of a central axis of the opening 145 would intersect with at least a portion of the rigid endcap 305. The central axis of the opening 145 can extend into and out of the page in FIG. 3. In some arrangements, at least 40 percent, at least 45 percent, at least 50 percent, at least 55 percent, at least 60 percent, at least 65 percent, at least 70 percent, at least 75 percent, at least 80 percent, at least 85 percent, at least 90 percent, at least 95 percent, or 100 percent of the opening can be directly below the rigid endcap 305. In some arrangements, the opening 145 can also be directly below the soft duct 300, for example, as shown in FIG. 3. In such case, an imaginary projection of the opening 145 in the direction of the central axis of the opening 145 would intersect with at least a portion of the rigid endcap 305 and a portion of the soft duct 300.

In one or more arrangements, a portion of the rigid endcap 305 and a portion of the soft duct 300 can overlap each other, as is shown in FIG. 3. As an example, the flange 315 of the rigid endcap 305 and the flange 310 of the soft duct 300 can overlap each other in an overlap region 335. In one or more arrangements, the flange 310 of the soft duct 300 can be located between the outer surface 200 of the headliner 135 and the flange 315 of the rigid endcap 305 in the overlap region 335, as shown in FIG. 3. Alternatively, the flange 315 of the rigid endcap 305 can be located between the outer surface 200 of the headliner 135 and the flange 310 of the soft duct 300. The overlap region 335 can have a width 340. The width 340 can be any suitable size, such as substantially two inches or less, substantially one inch or less, substantially 0.5 inches or less, etc. The width 340 of the overlap region 335 can be substantially uniform, or the width 340 can vary.

In one or more arrangements, a portion of the rigid endcap 305 can abut a portion of the soft duct 300. For instance, a flange end 345 of the rigid endcap 305 opposite the terminating end 330 can abut an end 350 of the soft duct 300. In this case, the flange 315 of the rigid endcap 305 can be operatively connected only to the outer surface 200 of the headliner 135. However, in other arrangements, the flange end 345 and the end 350 can be operatively connected to each other, such as at their abutting ends. The flange end 345 of the rigid endcap 305 and the end 350 of the soft duct 300 can be linear or nonlinear, for example, the flange end 345 and the end 350 are nonlinear in FIG. 3. In some arrangements, the flange end 345 of the rigid endcap 305 and the end 350 of the soft duct 300 can be configured to substantially matingly engage each other.

In one or more arrangements, the rigid endcap 305 can substantially cover the register 160. Substantially cover means that the rigid endcap 305 is aligned with the register 160 such that an imaginary projection of the register 160 in a direction of a central axis of the register 160 would intersect with at least a portion of the rigid endcap 305. The central axis of the opening 145 can extend into and out of the page in FIG. 3. As shown in FIG. 3, for example, the entire register 160 can be substantially covered by the rigid endcap 305. In other arrangements, the rigid endcap 305 can substantially cover, e.g., 100 percent, 95 percent or greater, 90 percent or greater, 85 percent or greater, 80 percent or greater, etc. of the register 160. The rigid endcap 305 can be spaced from the register 160. The rigid endcap 305 can protect the register 160 during the CSA deployment.

In one or more arrangements, a portion of the opening 145 can extend past the terminal end 325 of the airflow channel 320, e.g., past the terminating end 330 of the rigid endcap 305. In this case, other components may be located within the portion of the opening 145 that extends past the terminal end 325 of the airflow channel 320. Examples of such components include other registers, lights, switches, etc. A gasket or seal can be operatively positioned with respect to the terminating end 330 of the rigid endcap 305. A portion of the register 160 and/or the outer surface 200 of the headliner 135 can minimize the flow of air past the terminating end 330 of the rigid endcap 305.

Figure 5:
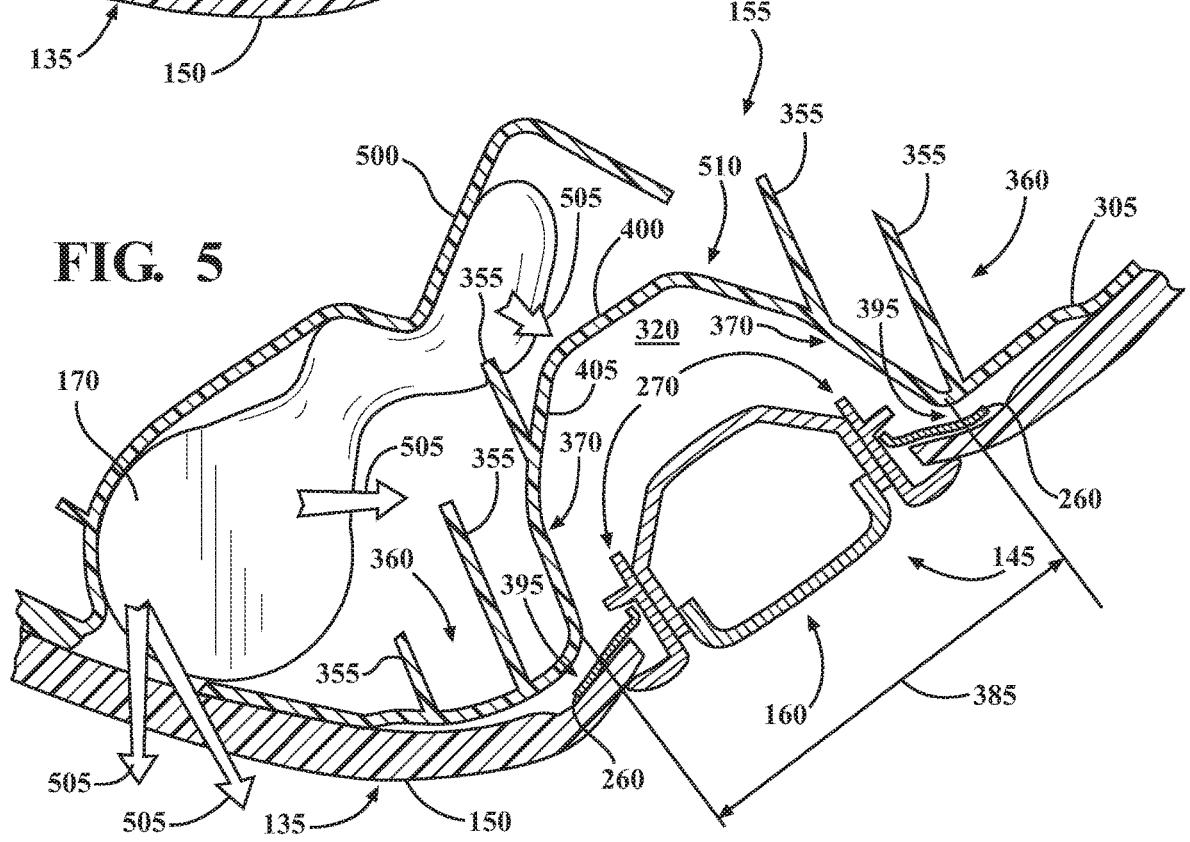
FIG. 5 is a cross-sectional view of the duct system, viewed along the line 5-5 in FIG. 3, showing the structural fins and an arch of the rigid endcap.

With reference to FIGS. 4-5, the rigid endcap 305 can include an outer surface 400 and an inner surface 405. The rigid endcap 305 can include structural fins 355 on the outer surface 400 of the rigid endcap 305. The structural fins 355 can be located at any position along the outer surface 400 of the rigid endcap 305. The outer surface 400 can be configured to define pockets 360. The pockets 360 can be indentations or recesses in the outer surface 400 of the rigid endcap 305. The pockets 360 can enable the structural fins 355 to have extended lengths for added rigidity at specific locations of the rigid endcap 305. The structural fins 355 can be provided in locations that correspond to where the CSA 170 can make contact with the rigid endcap 305 during deployment.

To illustrates the effects of the pockets 360 and the structural fins 355, FIG. 5 is a cross-sectional view of the rigid endcap 305 along the line 5-5 in FIG. 3. FIG. 5 shows the indentations made by the pockets 360, and it shows the structural fins 355 within the pockets 360. At the location of the cross-section of FIG. 4, the rigid endcap 305 does not include a pocket 360, i.e., an indentation toward the headliner 135. As discussed further below, the CSA 170 shown in FIG. 5 is in the process of being deployed and is beginning to make contact with the rigid endcap 305, i.e., a structural fin 355 of the rigid endcap 305.

In some arrangements, the CSA 170 can be operatively connected to the outer surface 200 of the headliner 135, the duct system 155, a portion 500 of the vehicle 100 near the lateral edge 165 of the headliner 135, or any combination thereof. Due to the configuration of the headliner 135 and the duct system 155, the CSA 170 can be located near the register 160 and thus the rigid endcap 305. Upon the occurrence or detection of an activation event, the CSA 170 can be rapidly inflated, causing the CSA 170 to expand in outward directions 505 toward the rigid endcap 305 and the headliner 135. This expansion of the CSA 170 can result in a deployment force applied to the headliner 135 and any nearby component, such as the rigid endcap 305 of the duct system 155. The deployment force can cause the headliner 135 to (e.g., tear, move, deform, rotate, or any combination thereof) such that the CSA can extend through the headliner 135 and into the deployed position, as shown in FIG. 1.

It should be noted that some of the flow of the air in the airflow channel 320 can be restricted by the register 160. For instance, a front face 365 of the register 160 can restrict the flow of air moving through the airflow channel 320. In one or more arrangements, the inner surface 405 of the rigid endcap 305 can be configured to facilitate the flow of air around the front face 365 of the register 160 and/or to direct the flow of air in the airflow channel 320 toward the opening 145. For instance, the inner surface 405 can include pocket contours 370 (FIG. 5) along the airflow channel 320. The pocket contours 370 can direct an airflow 380 around the front face 365 of the register 160 and toward the opening 145. The pocket contours 370 can cause the airflow channel 320 to taper along at least a portion of its length in going from the end 350 to the terminating end 330 in the direction of the airflow 380. The pocket contours 370 formed in the inner surface 405 can correspond to the pockets 360 defined in the outer surface 400 of the rigid endcap 305.

With reference to FIG. 5, the rigid endcap 305 can form an arch 510 above the register 160. A span 385 of the arch 510 can decrease in going from the end 350 to the terminating end 330 of the rigid endcap 305. In some arrangements, the tapering of the airflow channel 320 can stop at a point 390 (FIG. 3) along the rigid endcap 305, and the span 385 can remain substantially constant thereafter toward the terminating end 330 of the rigid endcap 305. The cross-sectional view of FIG. 5 is located in a region of the rigid endcap 305 where the span 385 is uniform. The arch 510 can add additional rigidity to the rigid endcap 305.

During deployment of the CSA 170, the CSA 170 can impinge upon the rigid endcap 305. The rigid endcap 305 can be pushed downwardly toward the opening 145 and make contact with the bracket 260 in contact areas 395, as shown in FIG. 5. The rigid endcap 305 can be configured to withstand the deployment force without substantially breaking or deforming. For example, the rigid endcap 305 can transfer the deployment force through the structural fins 355, the arch 510, the bracket 260 and into the headliner 135 of the duct system 155.

It will be appreciated that arrangements described herein can provide numerous benefits, including one or more of the benefits mentioned herein. For example, arrangements described herein can prevent or reduce damage to duct system 155 and can prevent the register 160 from being damaged or displaced during the CSA deployment. More particularly, arrangements described herein can allow deployment of the CSA 170 without deforming the duct system 155 and causing components of the register 160, such as the louvers 280, to break off and become projectiles within the interior 105 of the vehicle 100. Furthermore, arrangements described herein can prevent damage to other sensitive components, such as electronics, safety features, lights, switches, and other types of registers, air vents, etc., during the CSA deployment. Arrangements described herein can maintain an unobstructed air flow passage during CSA deployment and during normal operation.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A duct system for a vehicle, comprising:
 a headliner defining an opening;
 a soft duct operatively connected to the headliner;
 a rigid endcap operatively connected to the headliner and to the soft duct, an airflow channel being formed by the headliner, the soft duct, and the rigid endcap; and
 the rigid endcap defining a terminal end of the airflow channel, and the opening being located along the airflow channel directly below the rigid endcap.

2. The duct system of claim 1, further comprising a register operatively connected to the opening in the headliner.

3. The duct system of claim 2, wherein the rigid endcap substantially covers the register.

4. The duct system of claim 1, further comprising an airbag, wherein the rigid endcap is positioned between an airbag and the opening.

5. The duct system of claim 4, wherein the rigid endcap includes structural fins on an outer surface of the rigid endcap and formed as a single piece with the endcap.

6. The duct system of claim 4, wherein the airbag is a curtain side airbag positioned proximate to a lateral edge of the headliner.

7. The duct system of claim 1, wherein an end of the rigid endcap abuts an end of the soft duct.

8. The duct system of claim 1, wherein a portion of the rigid endcap overlaps a portion of the soft duct.

9. The duct system of claim 1, wherein the rigid endcap includes an inner surface configured to direct an airflow in the airflow channel toward the opening.

10. The duct system of claim 9, wherein the inner surface of the rigid endcap tapers along the airflow channel.

11. The duct system of claim 5 wherein the structural fins are structured to extend between the outer surface of the rigid endcap and an airbag.

12. The duct system of claim 11 wherein at least one of the structural fins is positioned so as to enable contact with the airbag during inflation of the airbag.

13. The duct system of claim 5 further comprising at least one pocket formed between a pair of structural fins extending and structured to form a recess in the outer surface of the rigid endcap.

\* \* \* \* \*